United States Patent
Yang et al.

(10) Patent No.: US 10,532,730 B2
(45) Date of Patent: Jan. 14, 2020

(54) APPARATUS AND METHOD OF REDUCING VIBRATIONS OF HYBRID ELECTRIC VEHICLE

(71) Applicant: HYUNDAI MOTOR COMPANY, Seoul (KR)

(72) Inventors: Byunghoon Yang, Seongnam (KR); Jeong Soo Eo, Hwaseong-si (KR); Youngkwan Ko, Seoul (KR); Mu Shin Kwak, Osan-si (KR); Tae Hee Jung, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 519 days.

(21) Appl. No.: 15/375,749

(22) Filed: Dec. 12, 2016

(65) Prior Publication Data

US 2018/0105160 A1    Apr. 19, 2018

(30) Foreign Application Priority Data

Oct. 13, 2016    (KR) .................. 10-2016-0132736

(51) Int. Cl.
    *B60W 20/15*    (2016.01)
    *B60K 6/24*     (2007.10)

(52) U.S. Cl.
    CPC ........... *B60W 20/15* (2016.01); *B60K 6/24* (2013.01); *B60W 2510/081* (2013.01);
    (Continued)

(58) Field of Classification Search
    None
    See application file for complete search history.

(56) References Cited

U.S. PATENT DOCUMENTS

| 7,633,257 | B2  | 12/2009 | Sakamoto et al. |
| 2015/0180386 | A1* | 6/2015 | Enoki ............. H02P 6/10 318/400.23 |

FOREIGN PATENT DOCUMENTS

| KR | 10-2010-0064603 A | 6/2010 |
| KR | 10-1619663 B1 | 5/2016 |

OTHER PUBLICATIONS

Vibration-reducing Motor Control for Hybrid Vehicles R&D Review of Toyota CRDL vol. 40. No. 2.

* cited by examiner

*Primary Examiner* — John Olszewski
*Assistant Examiner* — Gerrad A Foster
(74) *Attorney, Agent, or Firm* — Morgan, Lewis & Bockius LLP (57) ABSTRACT

An apparatus for reducing vibrations of a two-cylinder engine for a hybrid electric vehicle includes a reference signal generator for generating a first reference signal and a first reference phase, a speed calculator for calculating a speed of the motor based on the position of the motor, a vibration extractor for extracting a first vibration signal based on the speed of the motor, a variable filter, a filter coefficient updater, a phase calculator, a phase shift compensator, a synchronization signal generator for generating a first synchronization signal synchronized with the first vibration signal based on a first reference phase transferred from the reference signal generator, the second phase difference transferred from the phase calculator and the first compensation value transferred from the phase shift compensator, an inverse phase signal generator, and a torque generator for generating a final command torque based on the first inverse phase signal.

13 Claims, 3 Drawing Sheets

(52) U.S. Cl.
CPC .... *B60W 2710/083* (2013.01); *B60Y 2200/92* (2013.01); *B60Y 2300/205* (2013.01); *B60Y 2400/48* (2013.01); *Y10S 903/905* (2013.01)

APPARATUS AND METHOD OF REDUCING VIBRATIONS OF HYBRID ELECTRIC VEHICLE

CROSS-REFERENCE TO RELATED APPLICATION

This application claims the benefit of priority to Korean Patent Application No. 10-2016-0132736, filed with the Korean Intellectual Property Office on Oct. 13, 2016, the entire contents of which are incorporated herein by reference.

TECHNICAL FIELD

The present disclosure relates to an apparatus and a method of reducing vibrations of a hybrid electric vehicle.

BACKGROUND

A hybrid electric vehicle uses both an internal combustion engine and an electric power supply. That is, the hybrid electric vehicle efficiently combines and uses power of the internal combustion engine and power of a motor. The hybrid electric vehicle uses both mechanical energy of an engine and electric energy of a battery and uses optimal operating areas, or speed ranges, of the engine and the motor, and recovers energy while braking. As a result, fuel efficiency can be improved and energy can be efficiently used.

The hybrid electric vehicle provides driving modes including an electric vehicle (EV) mode using only torque of the motor by connecting or releasing an engine clutch, a hybrid electric vehicle (HEV) mode using the torque of the motor as auxiliary torque while using the torque of the engine as a main torque, a regenerative braking mode for charging the battery by recovering braking and inertial energy through generation of the motor in braking or driving by inertia of the hybrid electric vehicle, and the like.

In recent years, as a method for effectively increasing the fuel efficiency of the hybrid electric vehicle, a research for applying a two-cylinder engine has been performed. However, since the two-cylinder engine has a problem in which vibration is excessive, a method of reducing the vibration is required.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus and a method of reducing vibrations of a hybrid electric vehicle having advantages of reducing vibrations of a two-cylinder engine based on the position of a motor.

Exemplary embodiments of the present disclosure provide an apparatus of reducing vibration of a two-cylinder engine for a hybrid electric vehicle, including: a reference signal generator generating a first reference signal and a first reference phase based on a position of a motor; a speed calculator calculating a speed of the motor based on the position of the motor; a vibration extractor extracting a first vibration signal based on the speed of the motor; a variable filter generating a second reference signal by filtering the first reference signal; a filter coefficient updater updating a first filter coefficient of the variable filter until a first phase difference between the first vibration signal and the second reference signal becomes a first threshold value or less; a phase calculator calculating a second phase difference between the first reference signal and the first vibration signal based on the speed of the motor and the first filter coefficient; a phase shift compensator generating a first compensation value for compensating a delay of the first vibration signal generated by the vibration extractor; a synchronization signal generator generating a first synchronization signal synchronized with the first vibration signal based on a first reference phase transferred from the reference signal generator, the second phase difference transferred from the phase calculator, and the first compensation value transferred from the phase shift compensator; an inverse phase signal generator generating a first inverse phase signal of the first synchronization signal; and a torque generator generating a final command torque based on the first inverse phase signal.

The vibration extractor may be a band pass filter and cutoff frequencies of the band pass filter may be determined according to a speed of an engine.

The apparatus may further include a deviation calculator calculating the first phase difference between the first vibration signal transferred from the vibration extractor and the second reference signal transferred from the variable filter and transferring the first phase difference to the filter coefficient updater.

The apparatus may further include an amplitude ratio determiner determining a first torque amplitude based on a magnitude of the first vibration signal.

The torque generator may include a multiplier generating a first inverse phase torque by multiplying the first inverse phase signal by the first torque amplitude, and an adder generating the final command torque by adding the first inverse phase torque and a command torque.

The synchronization signal generator may generate the first synchronization signal having a phase corresponding to a value acquired by adding the first compensation value transferred from the phase shift compensator to a value acquired by subtracting the second phase difference transferred from the phase calculator from the first reference phase transferred from the reference signal generator.

The reference signal generator may generate a third reference signal and a second reference phase corresponding to a harmonic component of the first vibration signal based on the position of the motor, the vibration extractor may extract a second vibration signal corresponding to the harmonic component based on the speed of the motor, the variable filter may generate a fourth reference signal by filtering the third reference signal, the filter coefficient updater may update a second filter coefficient of the variable filter until a third phase difference between the second vibration signal and the fourth reference signal becomes a second threshold value or less, the phase calculator may calculate a fourth phase difference between the third reference signal and the second vibration signal based on the speed of the motor and the second filter coefficient, the phase shift compensator may generate a second compensation value for compensating the delay of the second vibration signal, the synchronization signal generator may generate a second synchronization signal synchronized with the second vibration signal based on the second reference phase, the fourth phase difference, and the second compensation value, the inverse phase signal generator may generate a second inverse phase signal of the second synchronization signal, and the torque generator may generate the final command torque to which the harmonic component is reflected based on the second inverse phase signal.

The motor may be selectively connected with the two-cylinder engine by an engine clutch disposed between the two-cylinder engine and the motor.

Exemplary embodiment of the present disclosure also provide a method of reducing vibration of a two-cylinder engine for a hybrid electric vehicle, including: generating a first reference signal and a first reference phase based on a position of a motor and calculating a speed of the motor; extracting a first vibration signal based on the speed of the motor; generating a second reference signal by filtering the first reference signal; updating a first filter coefficient of a variable filter until a first phase difference between the first vibration signal and the second reference signal becomes a first threshold value or less; calculating a second phase difference between the first reference signal and the first vibration signal based on the speed of the motor and the first filter coefficient; generating a first compensation value for compensating a delay of the first vibration signal; generating a first synchronization signal synchronized with the first vibration signal based on the first reference phase, the second phase difference, and the first compensation value; generating a first inverse phase signal of the first synchronization signal; and generating a final command torque based on the first inverse phase signal.

The generating of the final command torque may include determining a first torque amplitude based on a magnitude of the first vibration signal, generating a first inverse phase torque by multiplying the first inverse phase signal by the first torque amplitude, and generating the final command torque by adding the first inverse phase torque and a command torque.

The first synchronization signal may have a phase corresponding to a value acquired by adding the first compensation value to a value acquired by subtracting the second phase difference from the first reference phase.

The method may further include: generating a third reference signal and a second reference phase corresponding to a harmonic component of the first vibration signal based on the position of the motor; extracting a second vibration signal corresponding to the harmonic component based on the speed of the motor; generating a fourth reference signal by filtering the third reference signal; updating a second filter coefficient of the variable filter until a third phase difference between the second vibration signal and the fourth reference signal becomes a second threshold value or less; calculating a fourth phase difference between the third reference signal and the second vibration signal based on the speed of the motor and the second filter coefficient; generating a second compensation value for compensating the delay of the second vibration signal; generating a second synchronization signal synchronized with the second vibration signal based on the second reference phase, the fourth phase difference, and the second compensation value; generating a second inverse phase signal of the second synchronization signal; and generating the final command torque to which the harmonic component is reflected based on the second inverse phase signal.

The method of reducing vibration of a two-cylinder engine for a hybrid electric vehicle may be performed while the two-cylinder engine and the motor are connected to each other by an engine clutch.

According to exemplary embodiments of the present disclosure, vibration of a two-cylinder engine for a hybrid electric vehicle can be reduced. Further, an amplitude and a phase of a reference signal corresponding to each of the harmonic components of a vibration signal are controlled to reduce the harmonic component.

DETAILED DESCRIPTION

The present disclosure will be described more fully hereinafter with reference to the accompanying drawings, in which exemplary embodiments of the disclosure are shown. However, the present disclosure is not limited to the exemplary embodiments described below, but materialized in another form.

Accordingly, the drawings and description are to be regarded as illustrative in nature and not restrictive. Like reference numerals designate like elements throughout the specification.

In addition, each configuration illustrated in the drawings may be arbitrarily shown for understanding and ease of description, but the present disclosure is not limited thereto.

Figure 1:
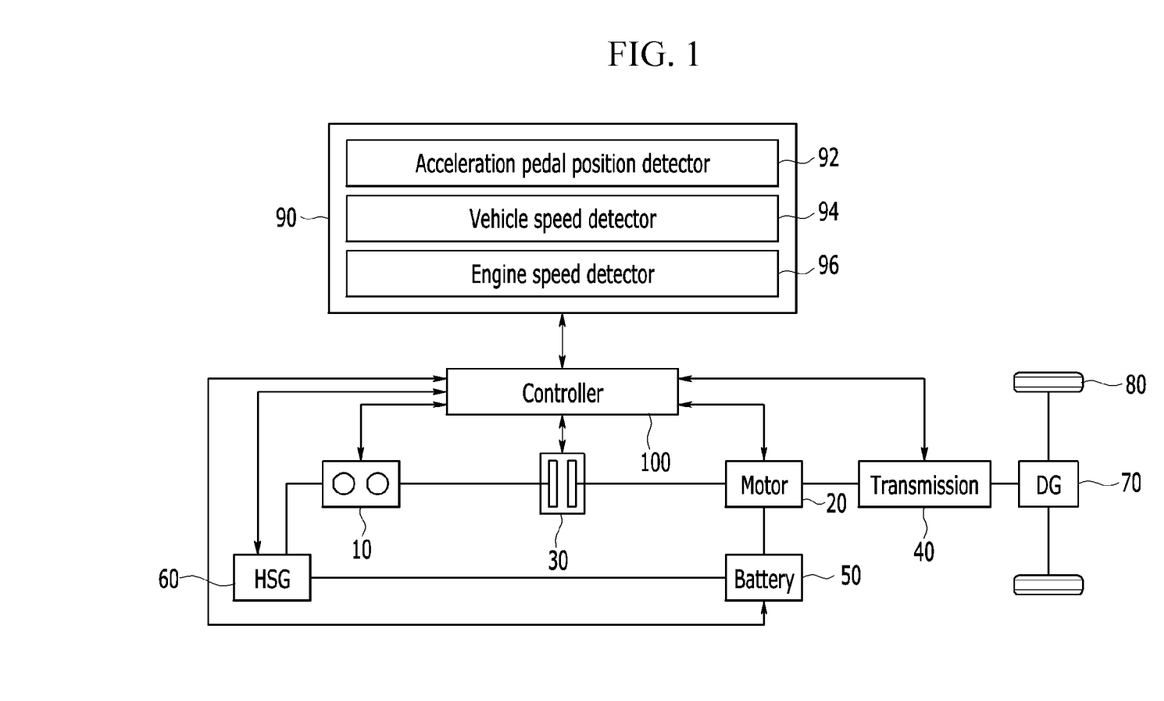
FIG. 1 is a block diagram of a hybrid electric vehicle according to exemplary embodiments of the present disclosure.

FIG. 1 is a block diagram of a hybrid electric vehicle according to exemplary embodiments of the present disclosure.

As illustrated in FIG. 1, the hybrid electric vehicle according to exemplary embodiments of the present disclosure includes an engine 10, a motor 20, an engine clutch 30, a transmission 40, a battery 50, a hybrid starter and generator (HSG) 60, a differential gear device 70, a wheel 80, a data detector 90 and a controller 100.

The engine 10 which combusts fuel to generate the power may adopt various engines including a gasoline engine, a diesel engine and the like. The engine 10 may be a two-cylinder engine. In the case of the two-cylinder engine, the size of the engine 10 is reduced to improve fuel efficiency, but there may be a problem in that engine vibration is excessive. Thus, a method of reducing vibrations according to exemplary embodiments of the present disclosure to be described below is proposed.

The motor 20 is disposed between the transmission 40 and the battery 50 and generates the power by using electricity of the battery 50.

The engine clutch 30 is disposed between the engine 10 and the motor 20, and selectively connects the engine 10 and the motor 20.

The hybrid electric vehicle provides operations in driving modes including an electric vehicle (EV) mode using only torque of the motor 20 by connecting or releasing the engine clutch 30, a hybrid electric vehicle (HEV) mode using the torque of the motor 20 as auxiliary torque while using the torque of the engine 10 as main torque, a regenerative braking mode to charge the battery 50 by recovering braking and inertial energy through generation of the motor in braking or driving by inertia of the hybrid electric vehicle, and the like.

In the case of transferring the power of the hybrid electric vehicle, the power generated from the engine 10 and the motor 20 are selectively transferred to input shafts of the transmission 40 and a power output from an output shaft of the transmission 40 is transferred to a vehicle shaft via the differential gear device 70. The vehicle shaft rotates the wheel 80, and as a result, the hybrid electric vehicle is operated by the powers generated from the engine 10 and/or the motor 20.

The battery 50 may supply the electricity to the motor 20 in the electric vehicle (EV) mode and the hybrid electric vehicle (HEV) mode and be charged through the electricity recovered through the motor 20 in the regenerative braking mode.

The HSG 60 may actuate the engine 10 or be generated by the output of the engine 10.

The data detector 90 may include an acceleration pedal position detector 92, a vehicle speed detector 94 and an engine speed detector 96. The data detector 90 may further include detectors (e.g., a brake pedal position detector, and the like) for controlling the hybrid electric vehicle.

The acceleration pedal position detector 92 detects a position value (a pressed degree of an acceleration pedal) of the acceleration pedal and transfers a signal corresponding thereto to the controller 100. When the acceleration pedal is completely pressed, the position value of the acceleration pedal is 100% and when the acceleration pedal is not pressed, the position value of the acceleration pedal is 0%.

The vehicle speed detector 94 detects a speed of the hybrid electric vehicle and transfers a signal corresponding thereto to the controller 100.

The engine speed detector 96 detects the speed of the engine 10 and transfers a signal corresponding thereto to the controller 100.

The controller 100 may be implemented by one or more processors that operate by a predetermined program and the predetermined program may include a series of commands for performing each step included in a method of reducing vibrations of a hybrid electric vehicle according to exemplary embodiments of the present disclosure to be described below.

Figure 2:
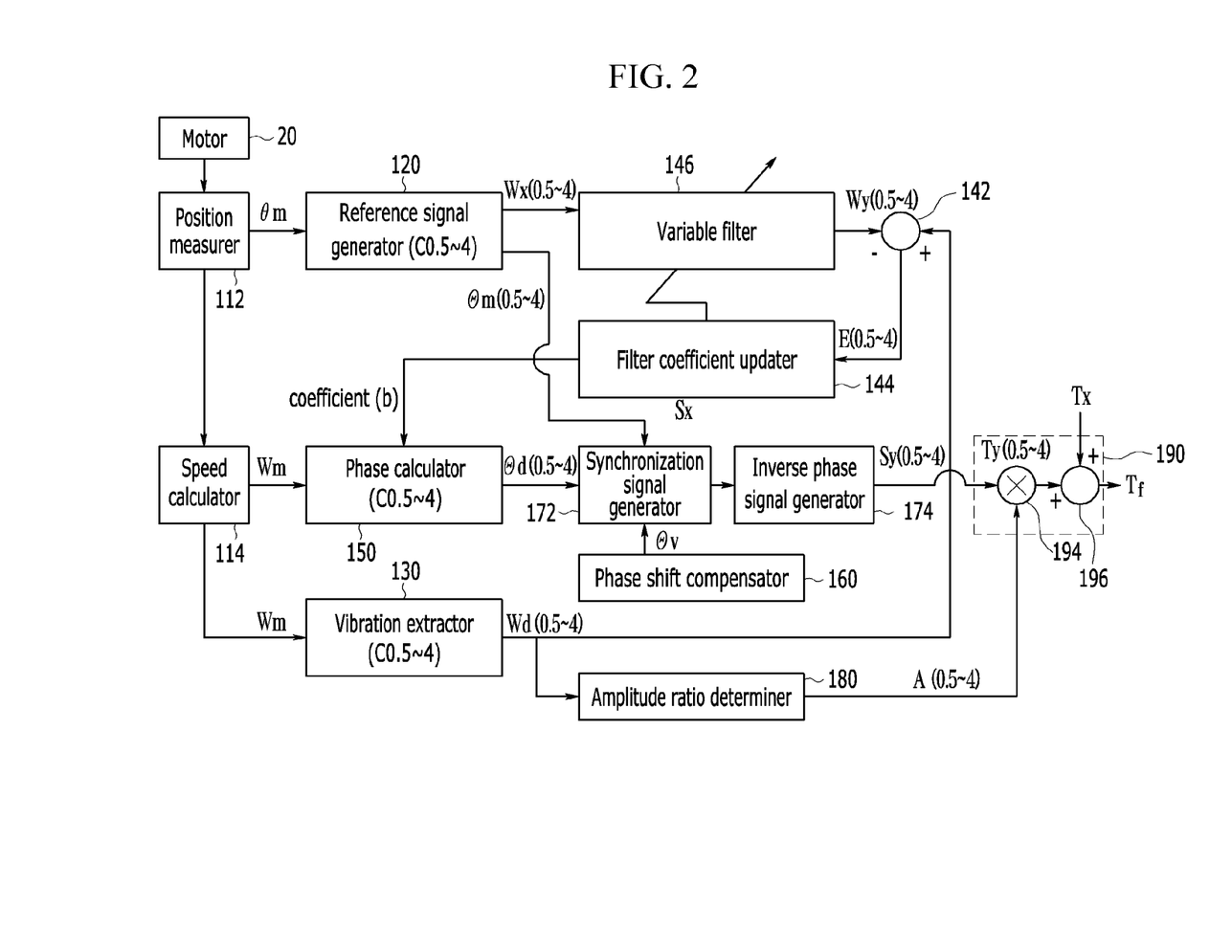
FIG. 2 is a block diagram of an apparatus for reducing vibrations of a hybrid electric vehicle according to exemplary embodiments of the present disclosure.

FIG. 2 is a block diagram of an apparatus for reducing vibrations of the hybrid electric vehicle according to exemplary embodiments of the present disclosure.

As illustrated in FIG. 2, the apparatus of reducing vibrations of the hybrid electric vehicle according to exemplary embodiments of the present disclosure may include the motor 20, a position measurer 112, a reference signal generator 120, a speed calculator 114, a vibration extractor 130, a deviation calculator 142, a filter coefficient updater 144, a variable filter 146, a phase calculator 150, a phase shift compensator 160, a synchronization signal generator 172, an inverse phase signal generator 174, an amplitude ratio determiner 180 and a torque generator 190. The reference signal generator 120, the speed calculator 114, the vibration extractor 130, the deviation calculator 142, the filter coefficient updater 144, the variable filter 146, the phase calculator 150, the phase shift compensator 160, the synchronization signal generator 172, the inverse phase signal generator 174, the amplitude ratio determiner 180 and the torque generator 190 may be components of the controller 100.

The position measurer 112 measures a position $\theta_m$ of the motor 20. The position measurer 112 may be a resolver that detects a rotational angle of a rotor of the motor 20.

The reference signal generator 120 receives the position $\theta_m$ of the motor 20 from the position measurer 112 and generates a reference signal $W_x$ based on the position $\theta_m$ of the motor 20. The reference signal generator 120 may generate a unit sine wave ($W_x = \sin(\theta_m)$) having a size of 1. Further, the reference signal generator 120 may generate a reference phase $\Theta_m$ based on the position $\theta_m$ of the motor 20. In the case of the two-cylinder engine, the reference phase $\Theta_m$ is the same as position $\theta_m$ of the motor 20. The reference signal $W_x$ is transferred to the variable filter 146 and the reference phase $\Theta_m$ is transferred to the synchronization signal generator 172.

The speed calculator 114 calculates a speed $W_m$ of the motor 20 based on the position $\theta_m$ of the motor 20. The speed calculator 114 receives the position $\theta_m$ of the motor 20 measured by the position measurer 112 and differentiates the position $\theta_m$ of the motor 20 to calculate the speed $W_m$ of the motor 20.

The vibration extractor 130 may receive the speed $W_m$ of the motor 20 calculated by the speed calculator 114 and extract a vibration signal $W_d$ based on the speed $W_m$ of the motor 20. The vibration extractor 130 may be a band pass filter and the band pass filter may be implemented by directly coupling a high pass filter and a low pass filter having a butterworth characteristic. Cutoff frequencies of the band pass filter may be variable according to the speed of the engine 10. In the case of the two-cylinder engine, since explosions occurs one time when the engine 10 rotates one time, the vibration signal has a fundamental vibration component (normally, referred to as "C1" in the art) in which a fundamental frequency becomes one time as high as an engine RPM of the engine 10. Further, the vibration signal may have harmonic components (C0.5, C2, and C4).

The deviation calculator 142 calculates a phase difference E between the vibration signal $W_d$ transferred from the vibration extractor 130 and the reference signal $W_y$ transferred from the variable filter 146. The phase difference E is transferred to the filter coefficient updater 144.

The filter coefficient updater 144 may determine filter coefficients ($b_0$ and $b_1$) in which the phase difference E becomes the minimum. For example, the filter coefficient updater 144 may update the filter coefficients ($b_0$ and $b_1$) until the phase difference E is equal to or less than a threshold value V. The threshold value V may be set as a value which those skilled in the art determine to be preferable by considering performance of the variable filter 146.

The variable filter 146 filters the reference signal $W_x$ generated by the reference signal generator 120 based on the filter coefficients updated by the filter coefficient updater 144. The variable filter 146 may be designed to satisfy Equation 1, shown below.

$$H(z) = b_1 z^{-1} + b_0 \quad \text{[Equation 1]}$$

In Equation 1, $b_0$ and $b_1$ represent filter coefficients updated by the filter coefficient updater 144. The variable filter 146 generates the reference signal $W_y$ by filtering the reference signal $W_x$ (that is, $W_y = H(z)W_x$). The reference signal $W_y$ is transferred to the deviation calculator 142.

The phase calculator 150 receives the speed $W_m$ of the motor 20 from the speed calculator 114 and receives the filter coefficients $b_0$ and $b_1$ from the filter coefficient updater 144. The phase calculator 150 calculates the phase difference $\Theta_d$ between the reference signal $W_x$ generated by the reference signal generator 120 and the vibration signal $W_d$ extracted by the vibration extractor 130 based on the speed $W_m$ of the motor 20 and the filter coefficients $b_0$ and $b_1$. The phase calculator 150 may calculate the phase difference $\Theta_d$ by using Equation 2 given below.

$$\Theta_d = \angle H(e^{j\omega T_s}) = \tan^{-1}\frac{-b_1\sin(\omega T_s)}{b_0 + b_1\cos(\omega T_s)} \qquad \text{[Equation 2]}$$

In Equation 2, w represents the speed $W_m$ of the motor 20 and $T_s$ represents a sampling time at which the apparatus for reducing vibration operates.

The phase shift compensator 160 may generate a compensation value $\Theta_v$ in order to compensate for a delay of the vibration signal generated by the vibration extractor 130 (band pass filter). The phase shift compensator 160 may generate the compensation value $\Theta_v$ based on the speed $W_m$ of the motor 20. For example, the phase shift compensator 160 multiplies the speed $W_m$ of the motor 20 by a set value to generate the compensation value $\Theta_v$ and the set value may be set as a value which those skilled in the art determine to be preferable by considering the performance of the vibration extractor 130.

The synchronization signal generator 172 generates a synchronization signal $S_x$ synchronized with the vibration signal $W_d$ based on the reference phase $\Theta_m$ transferred from the reference signal generator 120, the phase difference $\Theta_d$ transferred from the phase calculator 150 and the compensation value $\Theta_v$ transferred from the phase shift compensator 160. In detail, the synchronization signal generator 172 may generate the synchronization signal $(S_x=\sin(\Theta_m-\Theta_d+\Theta_v))$ having a phase corresponding to a value acquired by adding the compensation value $\Theta_v$ to a value acquired by subtracting the phase difference $\Theta_d$ from the reference phase $\Theta_m$.

The inverse phase signal generator 174 generates an inverse phase signal $(S_y=-\sin(\Theta_m-\Theta_d+\Theta_v))$ of the synchronization signal $S_x$ transferred from the synchronization signal generator 172.

The amplitude ratio determiner 180 determines a torque amplitude A based on a magnitude of the vibration signal $W_d$. The torque amplitude A may have the same magnitude as the vibration signal $W_d$.

The torque generator 190 includes a multiplier 194 and an adder 196. The torque generator 190 may generate a final command torque $T_f$ based on the inverse phase signal $S_y$.

The multiplier 194 generates an inverse phase torque $(T_y=-A\sin(\Theta_n-\Theta_d+\Theta_v))$ by multiplying the inverse phase signal $S_y$ by the torque amplitude A.

The adder 196 generates the final command torque $T_f$ by adding the inverse phase torque $T_y$ and a command torque $T_x$. The command torque $T_x$ may be determined based on the position value of the acceleration pedal and the speed of the hybrid electric vehicle. The vibration of the two-cylinder engine 10 may be reduced by controlling the operation of the motor 20 so as to generate the finial command torque $T_f$.

Meanwhile, in order to reduce the vibrations of the engine 10 having the harmonic components C0.5, C2 and C4 of the vibration signal $W_d$, the reference signal generator 120 may generate the reference signal corresponding to each harmonic component. The inverse phase torque is generated by controlling the amplitude and the phase of the reference signal corresponding to each harmonic component to reduce the vibrations of the engine 10 having the harmonic component. Meanwhile, in the present disclosure, it is described that the harmonic components C0.5, C2 and C4 are considered in order to reduce the vibration of the engine 10, but the present disclosure is not limited thereto. That is, in order to reduce the vibrations of the engine 10, other harmonic components C1.5, C2.5, C3 and C3.5 may be further considered.

The reference signal generator 120 may generate reference signals $W_{x(C0.5)}$, $W_{x(C2)}$, and $W_{x(C4)}$ corresponding to the harmonic components C0.5, C2, and C4 based on the position of the motor 20. For example, the reference signal generator 120 may generate unit sine waves ($W_{x(C0.5)}=\sin(0.5\theta_m)$, $W_{x(C2)}=\sin(2\theta_m)$, and $W_{x(C4)}=\sin(4\theta m)$) having a size of 1. Further, the reference signal generator 120 may generate reference phases $\Theta_{m(C0.5)}$, $\Theta_{m(C2)}$, and $\Theta_{m(C4)}$ corresponding to the harmonic components C0.5, C2 and C4 based on the position $\theta_m$ of the motor 20. The reference phase $\Theta_{m(C0.5)}$ corresponding to the harmonic component C0.5 is 0.5 times larger than the position $\theta_m$ of the motor 20, the reference phase $\Theta_{m(C2)}$ corresponding to the harmonic component C2 is two times larger than the position $\theta_m$ of the motor 20, and the reference phase $\Theta_{m(C4)}$ corresponding to the harmonic component C4 is four times larger than the position $\theta_m$ of the motor 20. The reference signals $W_{x(C0.5)}$, $W_{x(C2)}$ and $W_{x(C4)}$ corresponding to the harmonic components C0.5, C2, and C4 are transferred to the variable filter 146 and the reference phases $\Theta_{m(C0.5)}$, $\Theta_{m(C2)}$ and $\Theta_{m(C4)}$ corresponding to the harmonic components C0.5, C2 and C4 are transferred to the synchronization signal generator 172.

The vibration extractor 130 may receive the speed $W_m$ of the motor 20 calculated by the speed calculator 114 and extract the vibration signals $W_{d(C0.5)}$, $W_{d(C2)}$ and $W_{d(C4)}$ corresponding to the harmonic components C0.5, C2 and C4 based on the speed $W_m$ of the motor 20. The vibration extractor 130 may include three band pass filters capable of extracting the vibration signals $W_{d(C0.5)}$, $W_{d(C2)}$ and $W_{d(C4)}$.

The deviation calculator 142 calculates phase differences ($E_{(C0.5)}=W_{d(C0.5)}-W_{y(C0.5)}$, $E_{(C2)}=W_{d(C2)}-W_{y(C2)}$ and $E_{(C4)}=W_{d(C4)}-W_{y(C4)}$ between the vibration signals $W_{d(C0.5)}$, $W_{d(C2)}$ and $W_{d(C4)}$ transferred from the vibration extractor 130 and the reference signals $W_{y(C0.5)}$, $W_{y(C2)}$ and $W_{y(C4)}$ transferred from the variable filter 146. The phase differences $E_{(C0.5)}$, $E_{(C2)}$ and $E_{(C4)}$ are transferred to the filter coefficient updater 144.

The filter coefficient updater 144 may determine filter coefficients $b_{0(C0.5)}$ and $b_{1(C0.5)}$ in which the phase difference $E_{(C0.5)}$ becomes the minimum, filter coefficients $b_{0(C2)}$ and $b_{1(C2)}$ in which the phase difference $E_{(C2)}$ becomes the minimum and filter coefficients $b_{0(C4)}$ and $b_{1(C4)}$ in which the phase difference $E_{(C4)}$ becomes the minimum. That is, the filter coefficient updater 144 may update the filter coefficients $b_{0(C0.5)}$ and $b_{1(C0.5)}$ until the phase difference $E_{(C0.5)}$ becomes a threshold value $V_{(C0.5)}$ or less, update the filter coefficients $b_{0(C2)}$ and $b_{1(C2)}$ until the phase difference $E_{(C2)}$ becomes a threshold value $V_{(C2)}$ or less and update the filter coefficients $b_{0(C4)}$ and $b_{1(C4)}$ until the phase difference $E_{(C4)}$ becomes a threshold value $V_{(C4)}$ or less. The threshold values $V_{(C0.5)}$, $V_{(C2)}$, and $V_{(C4)}$ may be set as values which those skilled in the art determine to be preferable by considering the performance of the variable filter 146.

The variable filter 146 filters the reference signals $W_{x(C0.5)}$, $W_{x(C2)}$ and $W_{x(C4)}$ corresponding to the harmonic components C0.5, C2 and C4 generated by the reference signal generator 120 based on the filter coefficients $b_{0(C0.5)}$, $b_{1(C0.5)}$, $b_{0(C2)}$, $b_{1(C2)}$, $b_{0(C4)}$ and $b_{1(C4)}$ updated by the filter coefficient updater 144.

The phase calculator 150 receives the speed $W_m$ of the motor 20 from the speed calculator 114 and receives the filter coefficients $b_{0(C0.5)}$, $b_{1(C0.5)}$, $b_{0(C2)}$, $b_{1(C2)}$, $b_{0(C4)}$ and $b_{1(C4)}$ from the filter coefficient updater 144. The phase calculator 150 calculates phase differences $\Theta_{d(C0.5)}$, $\Theta_{d(C2)}$ and $\Theta_{d(C4)}$ between the reference signals $W_{x(C0.5)}$, $W_{x(C2)}$ and $W_{x(C4)}$ and the vibration signals $W_{d(C0.5)}$, $W_{d(C2)}$ and $W_{d(C4)}$ based on the speed $W_m$ of the motor 20 and the filter coefficients $b_{0(C0.5)}$, $d_{1(C0.5)}$, $b_{0(C2)}$, $d_{1(C2)}$, $b_{0(C4)}$ and $b_{1(C4)}$.

The phase shift compensator 160 may generate compensation values $\Theta_{v(C0.5)}$, $\Theta_{v(C2)}$ and $\Theta_{v(C4)}$ in order to compensate delays of the vibration signals $W_{d(C0.5)}$, $W_{d(C2)}$ and $W_{d(C4)}$ generated by the vibration extractor 130.

The synchronization signal generator 172 generates synchronization signals $S_{x(C0.5)}$, $S_{x(C2)}$ and $S_{x(C4)}$ synchronized with the vibration signals $W_{d(C0.5)}$, $W_{d(C2)}$ and $W_{d(C4)}$ based on the reference phases $\Theta_{m(C0.5)}$, $\Theta_{m(C2)}$ and $\Theta_{m(C4)}$ transferred from the reference signal generator 120, the phase differences $\Theta_{d(C0.5)}$, $\Theta_{d(C2)}$ and $\Theta_{d(C4)}$ transferred from the phase calculator 150, and the compensation values $\Theta_{v(C0.5)}$, $\Theta_{v(C2)}$ and $\Theta_{v(C4)}$ transferred from the phase shift compensator 160. In detail, the synchronization signal generator 172 may generate the synchronization signal $(S_{x(C0.5)}=\sin(\Theta_{d(C0.5)}-\Theta_{d(C0.5)}+\Theta_{v(C0.5)}))$ having a phase corresponding to a value acquired by adding the compensation value $\Theta_{v(C0.5)}$ to a value acquired by subtracting the phase difference $\Theta_{d(C0.5)}$ from the reference phase $\Theta_{m(C0.5)}$, generate the synchronization signal $(S_{x(C2)}=\sin(\Theta_{m(C2)}-\Theta_{d(C2)}+\Theta_{v(C2)}))$ having a phase corresponding to a value acquired by adding the compensation value $\Theta_{v(C2)}$ to a value acquired by subtracting the phase difference $\Theta_{d(C2)}$ from the reference phase $\Theta_{m(C2)}$ and generate the synchronization signal $(S_{x(C0.5)}=\sin(\Theta_{m(C4)}-\Theta_{d(C4)}+\Theta_{v(C4)}))$ having a phase corresponding to a value acquired by adding the compensation value $\Theta_{v(C4)}$ to a value acquired by subtracting the phase difference $\Theta_{d(C4)}$ from the reference phase $\Theta_{m(C4)}$.

The inverse phase signal generator 174 generates inverse phase signals $S_{y(C0.5)}$, $S_{y(C2)}$ and $S_{y(C4)}$ of the synchronization signals $S_{x(C0.5)}$, $S_{x(C2)}$ and $S_{x(C4)}$ transferred from the synchronization signal generator 172.

The amplitude ratio determiner 180 determines torque amplitudes $A_{(C0.5)}$, $A_{(C2)}$ and $A_{(C4)}$ based on the magnitudes of the vibration signals $W_{d(C0.5)}$, $W_{d(C2)}$ and $W_{d(C4)}$. The torque amplitude $A_{(C0.5)}$ may have the same magnitude as the vibration signal $W_{d(C0.5)}$, the torque amplitude $A_{(C2)}$ may have the same magnitude as the vibration signal $W_{d(C2)}$ and the torque amplitude $A_{(C4)}$ may have the same magnitude as the vibration signal $W_{d(C4)}$.

The torque generator 190 may generate the final command torque $T_f$ to which the harmonic components C0.5, C2 and C4 of the vibration signal $W_d$ are reflected based on the inverse phase signals $S_{y(C0.5)}$, $S_{y(C2)}$ and $S_{y(C4)}$.

The multiplier 194 generates inverse phase torques $T_{y(C0.5)}$, $T_{y(C2)}$ and $T_{y(C4)}$ by multiplying the inverse phase signals $S_{y(C0.5)}$, $S_{y(C2)}$ and $S_{y(C4)}$ by the torque amplitudes $A_{(C0.5)}$, $A_{(C2)}$ and $A_{(C4)}$.

The adder 196 generates the final command torque $T_f$ by adding the inverse phase torque $T_{y(C1)}$ corresponding to the fundamental vibration component C1, the inverse phase torques $T_{y(C0.5)}$, $T_{y(C2)}$ and $T_{y(C4)}$ corresponding to the harmonic components C0.5, C2 and C4 and the command torque $T_x$. The apparatus of reducing vibrations according to exemplary embodiments of the present disclosure may reduce the vibrations of the two-cylinder engine 10 having the harmonic components C0.5, C2 and C4 as well as the fundamental vibration component C1 by controlling the operations of the motor 20 so as to generate the final command torque $T_f$.

Figure 3:
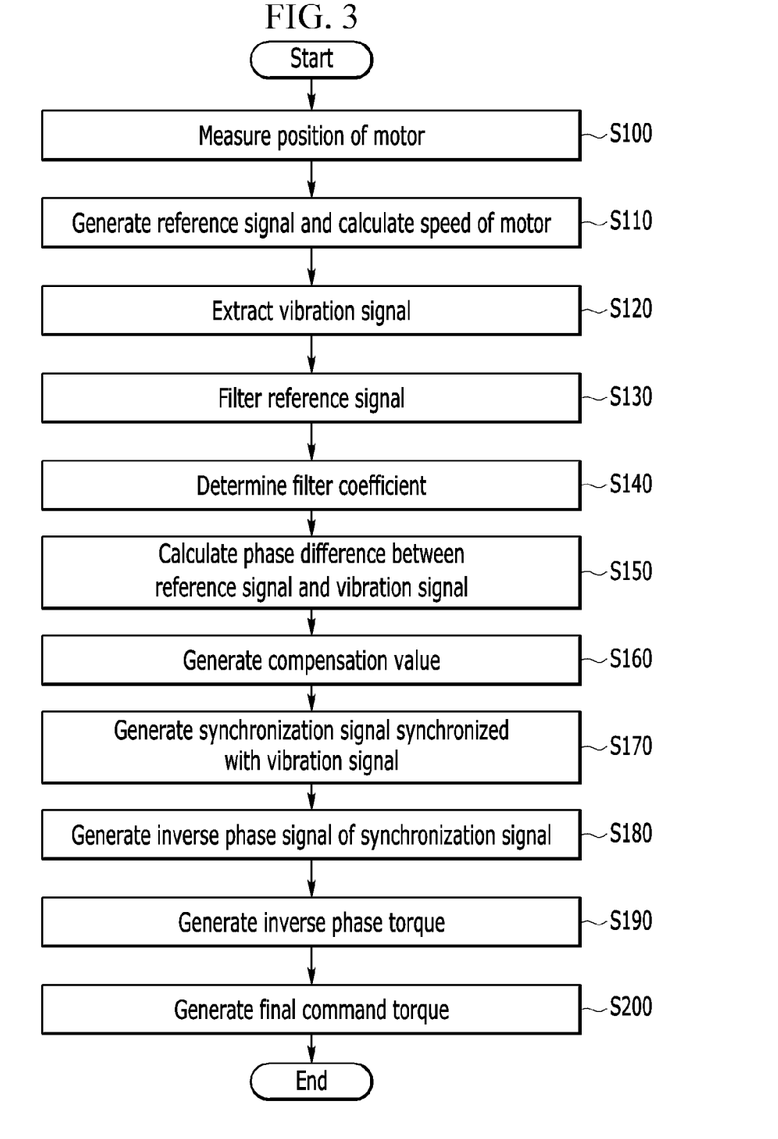
FIG. 3 is a flowchart of a method for reducing vibrations of a hybrid electric vehicle according to exemplary embodiments of the present disclosure.

FIG. 3 is a flowchart of a method for reducing vibrations of a hybrid electric vehicle according to exemplary embodiments of the present disclosure. The method for reducing vibrations of a hybrid electric vehicle according to exemplary embodiments of the present disclosure may be performed while the engine 10 and the motor 20 are connected to each other by the engine clutch 30.

As illustrated in FIG. 3, the position measurer measures the position $\theta_m$ of the motor 20 (S100).

The reference signal generator 120 generates the reference signal $W_x$ based on the position $\theta_m$ of the motor 20 and the speed calculator 114 calculates the speed $W_m$ of the motor 20 based on the position $\theta_m$ of the motor 20 (S110).

The vibration extractor 130 may extract the vibration signal $W_d$ based on the speed $W_m$ of the motor 20 (S120).

The variable filter 146 generates the reference signal $W_y$ by filtering the reference signal $W_x$ (S130).

The filter coefficient updater 144 may update the filter coefficients $b_0$ and $b_1$ of the variable filter 146 until a phase difference E between the vibration signal $W_d$ transferred from the vibration extractor 130 and the reference signal $W_y$ transferred from the variable filter 146 becomes a threshold value V or less (S140). That is, the filter coefficient updater 144 may determine the filter coefficients $b_0$ and $b_1$ in which the phase difference E between the vibration signal $W_d$ transferred from the vibration extractor 130 and the reference signal $W_y$ transferred from the variable filter 146 becomes the minimum. The variable filter 146 filters the reference signal $W_x$ generated by the reference signal generator 120 based on the filter coefficients $b_0$ and $b_1$.

The phase calculator 150 calculates the phase difference $\Theta_d$ between the reference signal $W_x$ and the vibration signal $W_d$ based on the speed $W_m$ of the motor 20 and the filter coefficients $b_0$ and $b_1$ (S150).

The phase shift compensator 160 generates the compensation value $\Theta_v$ for compensating the delay of the vibration signal generated by the vibration extractor 130 (S160).

The synchronization signal generator 172 generates the synchronization signal $S_x$ synchronized with the vibration signal $W_d$ based on the reference phase $\Theta_m$ transferred from the reference signal generator 120, the phase difference $\Theta_d$ transferred from the phase calculator 150, and the compensation value $\Theta_v$ transferred from the phase shift compensator 160 (S170).

The inverse phase signal generator 174 generates the inverse phase signal $S_y$ of the synchronization signal (S180).

The multiplier 194 generates the inverse phase torque $T_y$ by multiplying the inverse phase signal $S_y$ by the torque amplitude A (S190). The torque amplitude A may be determined based on the magnitude of the vibration signal $W_d$ by the amplitude ratio determiner 180.

The adder 196 generates the final command torque $T_f$ by adding the inverse phase torque $T_y$ and the command torque $T_x$ (S200). The command torque $T_x$ may be determined based on the position value of the acceleration pedal and the speed of the hybrid electric vehicle. Meanwhile, in order to reduce the vibrations of the engine 10 having the harmonic components C0.5, C2 and C4 of the fundamental vibration component C1, the reference signal generator 120 may generate the reference signals $W_{x(C0.5)}$, $W_{x(C2)}$ and $W_{x(C4)}$ corresponding to the respective harmonic components. In this case, the adder 196 may generate the final command torque $T_f$ by adding the inverse phase torque $T_{y(C1)}$ corresponding to the fundamental vibration component C1, the inverse phase torques $T_{y(C0.5)}$, $T_{y(C2)}$ and $T_{y(C4)}$ corresponding to the harmonic components C0.5, C2 and C4, and the command torque $T_x$.

As described above, according to exemplary embodiments of the present disclosure, the vibration of the two-cylinder engine for the hybrid electric vehicle may be reduced. Further, the harmonic component may be reduced by controlling the amplitudes and the phases of the reference signals corresponding to the harmonic components C0.5, C2 and C4 of the fundamental vibration component C1, respectively.

While this disclosure has been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for reducing vibrations of a two-cylinder engine for a hybrid electric vehicle, the apparatus comprising a processor configured for:
    generating a first reference signal and a first reference phase based on a position of a motor;
    calculating a speed of the motor based on the position of the motor;
    extracting a first vibration signal based on the speed of the motor;
    generating a second reference signal by filtering the first reference signal;
    updating a first filter coefficient until a first phase difference between the first vibration signal and the second reference signal becomes a first threshold value or less;
    calculating a second phase difference between the first reference signal and the first vibration signal based on the speed of the motor and the first filter coefficient;
    generating a first compensation value for compensating a delay of the first vibration signal;
    generating a first synchronization signal synchronized with the first vibration signal based on the first reference phase, the second phase difference and the first compensation value;
    generating a first inverse phase signal of the first synchronization signal; and
    generating a final command torque based on the first inverse phase signal.

2. The apparatus of claim 1, wherein the processor includes a band pass filter and cutoff frequencies of the band pass filter are determined according to a speed of the engine.

3. The apparatus of claim 1, wherein the processor is further configured for calculating the first phase difference between the first vibration signal and the second reference signal.

4. The apparatus of claim 1, wherein the processor is further configured for determining a first torque amplitude based on a magnitude of the first vibration signal.

5. The apparatus of claim 4, wherein the processor includes a multiplier for generating a first inverse phase torque by multiplying the first inverse phase signal by the first torque amplitude, and an adder for generating the final command torque by adding the first inverse phase torque and a command torque.

6. The apparatus of claim 1, wherein the processor generates the first synchronization signal synchronized having a phase corresponding to a value acquired by adding the first compensation value to a value acquired by subtracting the second phase difference from the first reference phase.

7. The apparatus of claim 1, wherein the processor:
    generates a third reference signal and a second reference phase corresponding to a harmonic component of the first vibration signal based on the position of the motor,
    extracts a second vibration signal corresponding to the harmonic component based on the speed of the motor,
    generates a fourth reference signal by filtering the third reference signal,
    updates a second filter coefficient until a third phase difference between the second vibration signal and the fourth reference signal becomes a second threshold value or less,
    calculates a fourth phase difference between the third reference signal and the second vibration signal based on the speed of the motor and the second filter coefficient,
    generates a second compensation value for compensating a delay of the second vibration signal,
    generates a second synchronization signal synchronized with the second vibration signal based on the second reference phase, the fourth phase difference, and the second compensation value,
    generates a second inverse phase signal of the second synchronization signal, and
    generates the final command torque to which the harmonic component is reflected based on the second inverse phase signal.

8. The apparatus of claim 1, wherein the motor is selectively connected with the two-cylinder engine by an engine clutch disposed between the two-cylinder engine and the motor.

9. A method of reducing vibrations of a two-cylinder engine for a hybrid electric vehicle, the method comprising:
    generating a first reference signal and a first reference phase based on a position of a motor, and calculating a speed of the motor;
    extracting a first vibration signal based on the speed of the motor;
    generating a second reference signal by filtering the first reference signal;
    updating a first filter coefficient until a first phase difference between the first vibration signal and the second reference signal becomes a first threshold value or less;
    calculating a second phase difference between the first reference signal and the first vibration signal based on the speed of the motor and the first filter coefficient;
    generating a first compensation value for compensating a delay of the first vibration signal;
    generating a first synchronization signal synchronized with the first vibration signal based on the first reference phase, the second phase difference and the first compensation value;
    generating a first inverse phase signal of the first synchronization signal; and generating a final command torque based on the first inverse phase signal.

10. The method of claim 9, wherein the step of generating the final command torque includes,
    determining a first torque amplitude based on a magnitude of the first vibration signal,
    generating a first inverse phase torque by multiplying the first inverse phase signal by the first torque amplitude, and
    generating the final command torque by adding the first inverse phase torque and a command torque.

11. The method of claim 9, wherein the first synchronization signal has a phase corresponding to a value acquired by adding the first compensation value to a value acquired by subtracting the second phase difference from the first reference phase.

12. The method of claim 9, further comprising:
    generating a third reference signal and a second reference phase corresponding to a harmonic component of the first vibration signal based on the position of the motor;

extracting a second vibration signal corresponding to the harmonic component based on the speed of the motor;
generating a fourth reference signal by filtering the third reference signal;
updating a second filter coefficient until a third phase difference between the second vibration signal and the fourth reference signal becomes a second threshold value or less;
calculating a fourth phase difference between the third reference signal and the second vibration signal based on the speed of the motor and the second filter coefficient;
generating a second compensation value for compensating the delay of the second vibration signal;
generating a second synchronization signal synchronized with the second vibration signal based on the second reference phase, the fourth phase difference, and the second compensation value;
generating a second inverse phase signal of the second synchronization signal; and
generating the final command torque to which the harmonic component is reflected based on the second inverse phase signal.

13. The method of claim 9, wherein the method of reducing vibration of the two-cylinder engine for a hybrid electric vehicle is performed while the two-cylinder engine and the motor are connected to each other by an engine clutch.

* * * * *